United States Patent
Xiong et al.

(10) Patent No.: US 10,232,507 B2
(45) Date of Patent: Mar. 19, 2019

(54) WAIST STRUCTURE AND HUMANOID ROBOT

(71) Applicant: UBTECH Robotics Corp., Shenzhen (CN)

(72) Inventors: Youjun Xiong, Shenzhen (CN); Meichun Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 181 days.

(21) Appl. No.: 15/469,557

(22) Filed: Mar. 26, 2017

(65) Prior Publication Data

US 2018/0186000 A1    Jul. 5, 2018

(30) Foreign Application Priority Data

Dec. 29, 2016  (CN) .......................... 2016 1 1248276

(51) Int. Cl.
  *B25J 9/10* (2006.01)
  *B62D 57/032* (2006.01)

(52) U.S. Cl.
  CPC .............. *B25J 9/102* (2013.01); *B62D 57/032* (2013.01)

(58) Field of Classification Search
  CPC ........ B25J 9/102; B62D 57/032; B62D 57/02; B62D 57/022
  See application file for complete search history.

(56) References Cited

U.S. PATENT DOCUMENTS

| | | | | |
|---|---|---|---|---|
| 6,580,969 B1* | 6/2003 | Ishida | ................. | B62D 57/032 180/8.1 |
| 6,583,595 B1* | 6/2003 | Hattori | ................. | B62D 57/032 318/567 |
| 6,832,132 B2* | 12/2004 | Ishida | ................. | B62D 57/032 180/8.1 |
| 6,969,965 B2* | 11/2005 | Takenaka | ............... | B62D 57/02 318/568.1 |
| 8,346,390 B2* | 1/2013 | Ruan | ....................... | B25J 5/007 180/252 |
| 2004/0025619 A1* | 2/2004 | Nakamura | ........... | B25J 17/0275 74/490.05 |
| 2007/0262743 A1* | 11/2007 | Kono | ....................... | B25J 19/06 318/661 |
| 2011/0040410 A1* | 2/2011 | Kim | ..................... | B62D 57/032 700/260 |

* cited by examiner

*Primary Examiner* — Joseph M Rocca
*Assistant Examiner* — Michael R Stabley

(57) ABSTRACT

A waist structure includes: a support assembly located between a trunk structure and two leg structures; a waist servo mounted on the support assembly and two first-stage leg servos; and a transmission member connected between the waist servo and the first-stage leg servos. The waist servo connects the trunk structure to the support assembly, and the first-stage leg servos connect the support assembly to the leg structures. The waist servo includes an output shaft connected to the transmission member. Each first-stage leg servo has a connecting end. The transmission member includes a first connecting member and a second connecting member securely mounted on the connecting ends, the first transmission member mounted on the output shaft and connected to the first connecting member, and the second transmission member which is driven by the first transmission member connects to the second connecting member.

10 Claims, 6 Drawing Sheets

WAIST STRUCTURE AND HUMANOID ROBOT

CROSS REFERENCE TO RELATED APPLICATIONS

This application claims priority to Chinese Patent Application No. 201611248276.7, filed Dec. 29, 2016, which is hereby incorporated by reference herein as if set forth in its entirety.

BACKGROUND

1. Technical Field

The present disclosure generally relates to robotic technology, and particularly to a waist structure and a humanoid robot including the waist structure.

2. Description of Related Art

For a long time, robot technology is mainly used in the production process automation, and developed to improve production efficiency and processing precision. Such robots are collectively referred to as industrial robots. Another type of robots are humanoid robots that can complete a variety of services at home, such as cleaning, entertaining, and home security, which requires humanoid robots to have flexible joints.

Some conventional humanoid robots usually include a servo at the waist to control the twist of the waist. However, only the twist of the waist is not enough to achieve a flexible movement of the joints of the legs of the humanoid robots that are connected to the waist.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
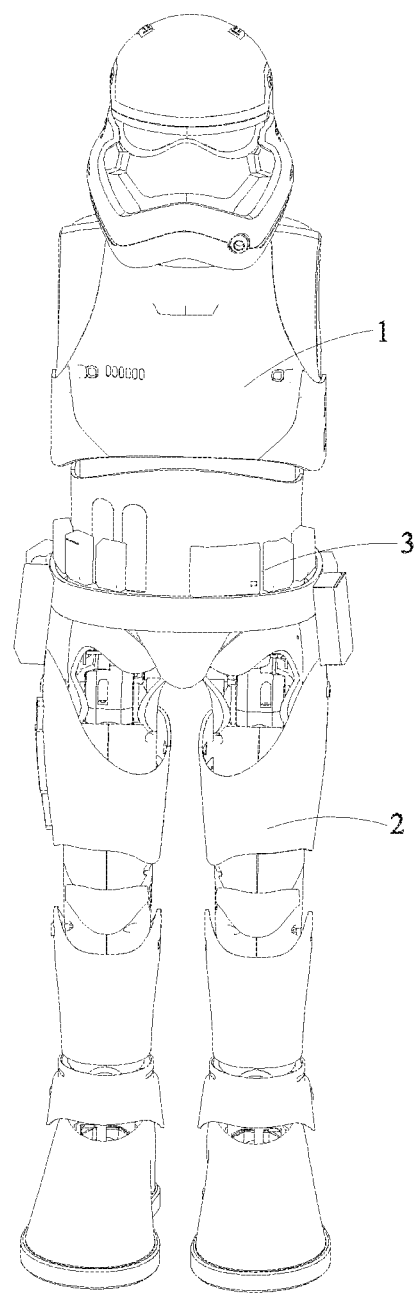
FIG. 1 is a front view of a humanoid robot according to one embodiment, with two arms omitted.
Figure 2:
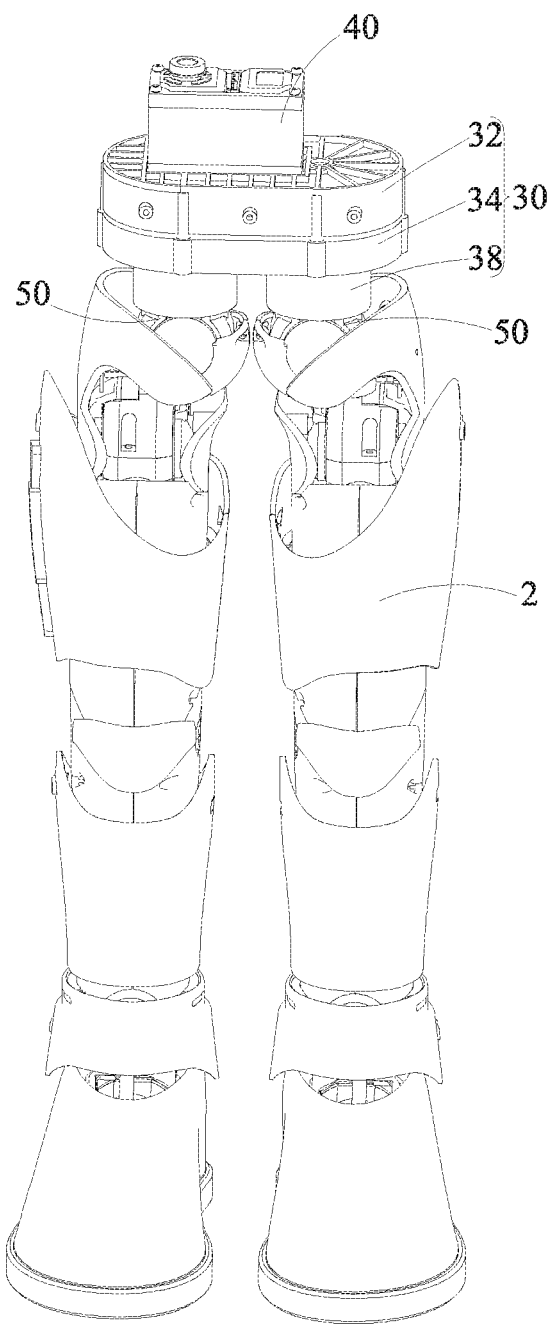
FIG. 2 is an isometric view of an assembly of a waist structure and leg structures according to one embodiment.
Figure 3:
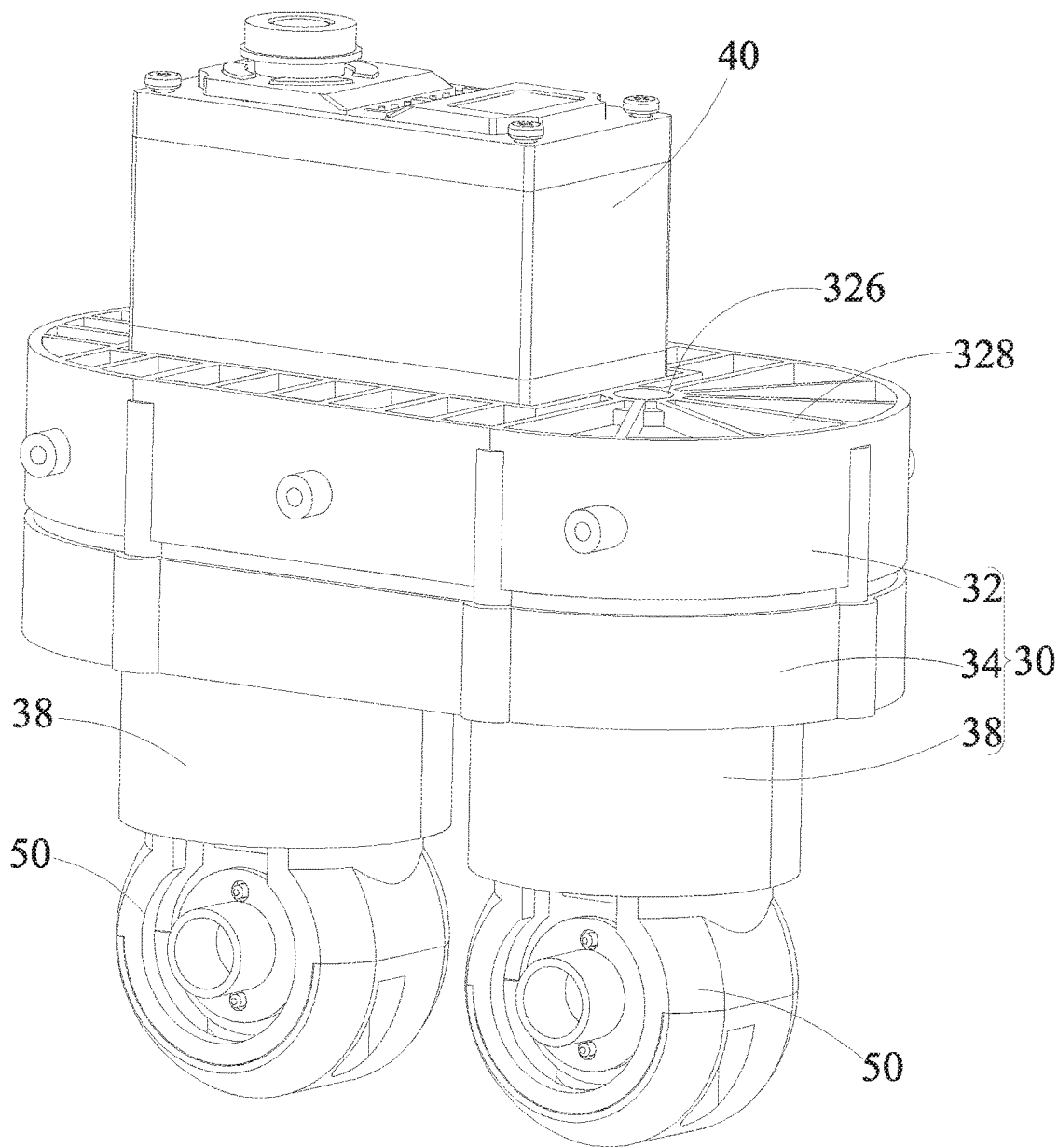
FIG. 3 is an isometric view of the waist structure according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-6, in one embodiment, a waist structure 3 is used for connecting a trunk structure 1 to leg structures 2 of a humanoid robot. The waist structure 3 includes: a support assembly 30 located between the trunk structure 1 and the leg structures 2, a waist servo 40 mounted on the support assembly 30 and a pair of first-stage leg servos 50, and a transmission 60 connected between the waist servo 40 and the first-stage leg servos 50 to enable the waist servo 40 to drive the first-stage leg servos 50 to rotate. The waist servo 40 is used to connect the trunk structure 1 to the support assembly 30. The first-stage leg servo 50 is used to connect the support assembly 30 to the leg structures 2.

The waist servo 40 includes an output shaft 42 connected to the transmission 60. Each of the first-stage leg servos 50 includes a connecting end 52. The transmission 60 includes a first connecting member 62 and a second connecting member 64 securely mounted on the connecting ends 52, a first transmission member 66 mounted on the output shaft 42 and connected to the first connecting member 62, and a second transmission member 68 which is driven by the first transmission member 66 to rotate and connected to the second connecting member 64.

The waist structure 3 is provided by a waist servo 40 connected to a trunk structure 1 and a first-stage leg servo 50 connected to a leg structure 2 and connecting the support assembly 30 and the leg structure 2 with the first-stage leg servo 50, such that the connection portion of the waist structure 3 and the leg structure 2 is rotatable. The waist structure 3 thus has a rotational degree of freedom relative to the leg structure 2, which improve the flexibility of the waist structure 3. The waist structure 3 uses the support assembly 30 to cause the waist servo 40 to be connected to the leg servos such that the waist servo 40 is connected to the trunk structure 1 and the first-stage leg servos 50 are connected to the leg structures 2. The first transmission member 66 and the second transmission member 68 are provided between the waist servo 40 and the two first-stage leg servos 50, and are fixed to the support assembly 30. The first transmission member 66 and the second transmission member 68 are mounted on the connecting ends 52 of the two first-stage leg servos 50 through the first connecting member 62 and the second connecting member 64.

In the embodiment, the first connecting member 62 and the second connecting member 64 are respectively arranged around the two connecting ends 52 so that the two first-stage leg servos 50 can drive the first transmission member 66 and the second transmission member 68 to rotate. When the waist servo 40 drives the first transmission member 66 to rotate, the first transmission member 66 drives the second transmission member 68 to rotate and they then drive the two servos 50 to rotate.

In the embodiment, the first transmission member 66 and the second transmission member 68 are gears that are engaged with each other. It is to be understood that the transmission between the waist servo 40 and the first-stage leg servos 50 is achieved by means of a gear transmission. The first transmission member 66 connected to the output shaft 42 of the waist servo 40 is the drive gear. The second transmission member 68 connected to the connecting end 52 of the first-stage leg servo 50 is the driven gear. In addition, the transmission between the waist servo 40 and the first-stage leg servo 50 may be other power transmission means such as a ratchet mechanism, and is not limited thereto.

Referring to FIGS. 3-6, the support assembly 30 includes a support cover 32 and a support base 34 securely connected to each other and a pair of fixing frames 38 for mounting the first transmission member 66 and the second transmission member 68. The support cover 32 and the support base 34 cooperatively define a receiving chamber 36 for accommodating the first transmission member 66 and the second transmission member 68. The support base 34 defines fixing holes 342 for allowing the two fixing frames to extend into the receiving chamber 36. The housings of the first-stage leg servos 50 are fixed to the fixing frames 38 and the connecting ends 52 thereof are inserted into the receiving chamber 36 and respectively connected with the first transmission member 66 and the second transmission member 68. The leg structure 2 is formed by providing a support cover 32 and a support base 34 securely connected to each other to form a receiving chamber 36 for accommodating the first transmission member 66 and the second transmission member 68. The first transmission member 66 and the second transmission member 68 are fixed to the fixing frames 38. The housings of the two first-stage leg servos 50 are fixed to the fixing frames 38. When the waist servo 40 drives the first transmission member 66 to rotate, the first fixing frame 38 and the second fixing frame 38 are then driven to rotate relative to the support cover 32 and the support base 34 that are connected to each other, thereby realizing the rotation of the waist structure 3, which is simple in structure and easy to be achieved.

Figure 4:
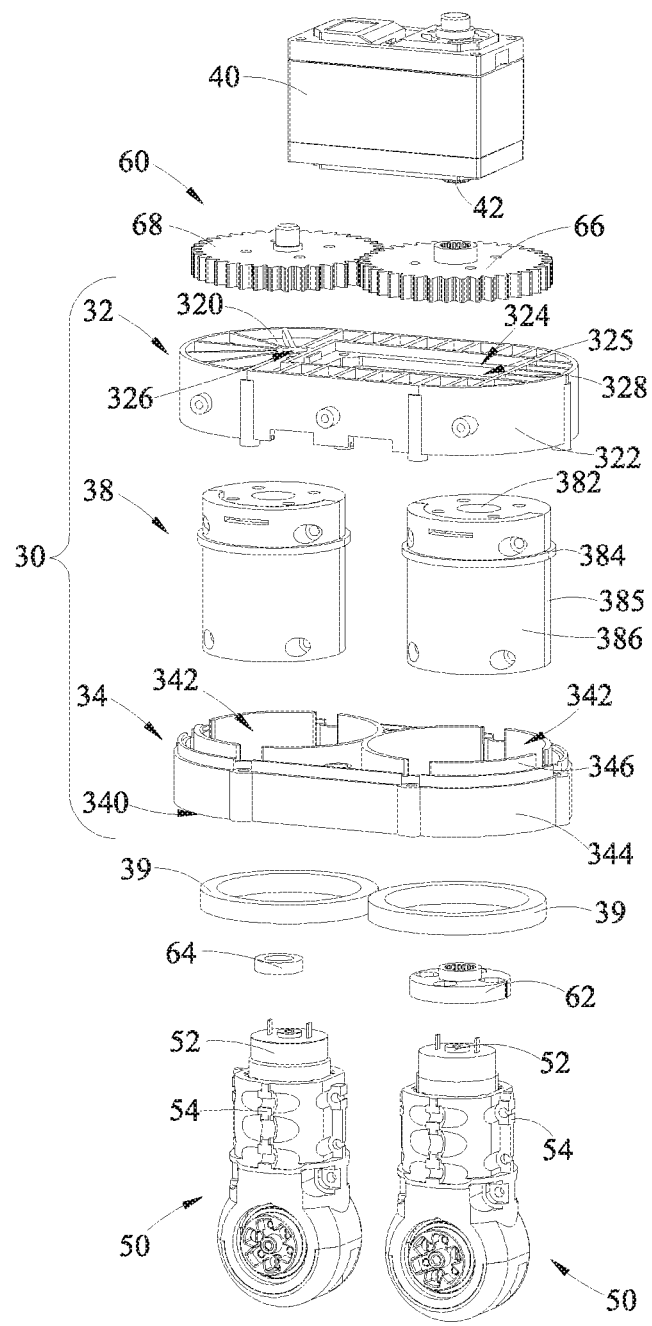
FIG. 4 is an exploded isometric view of the waist structure of FIG. 3.
Figure 5:
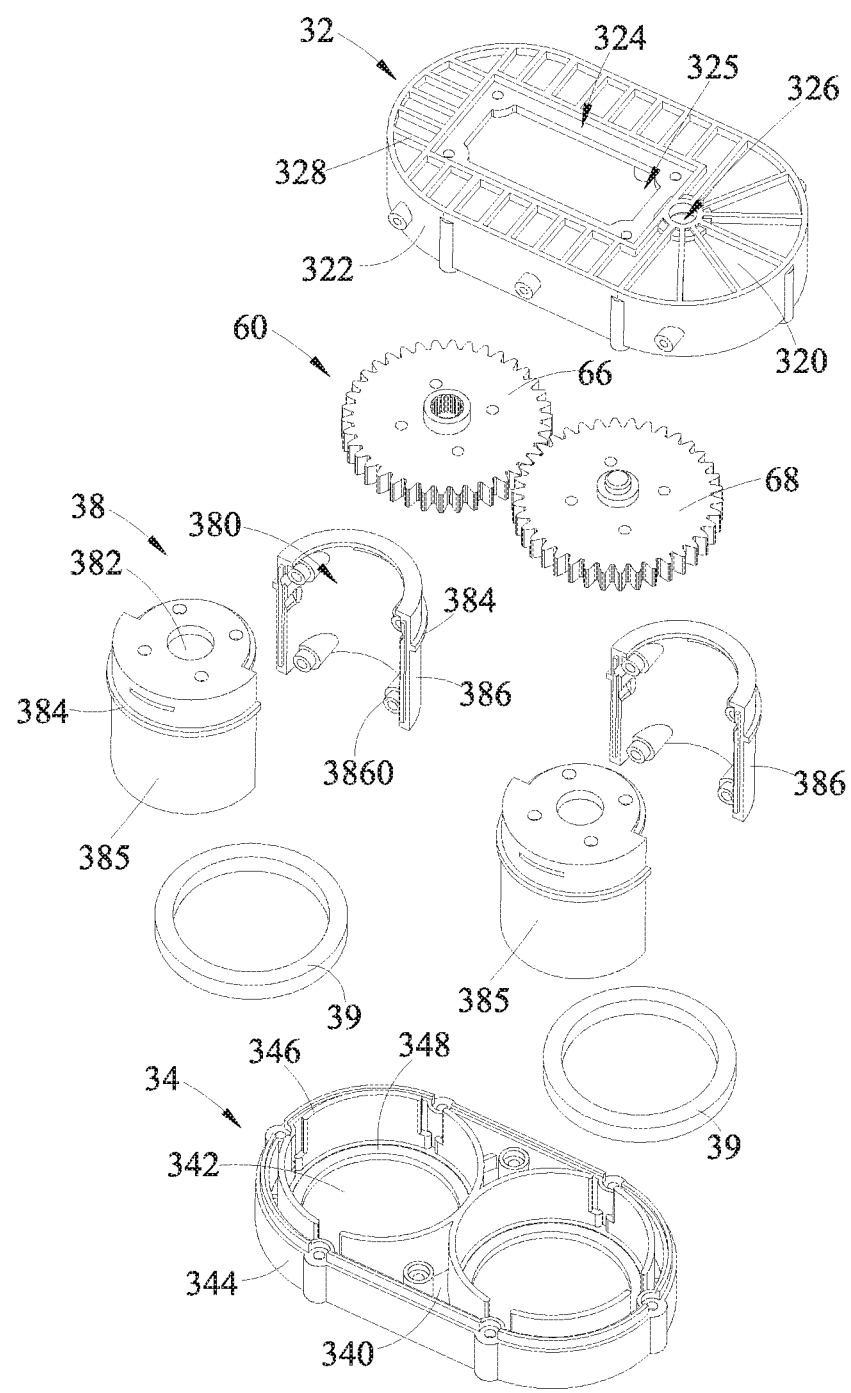
FIG. 5 is an exploded isometric view of the waist structure of FIG. 3 viewed from a first viewpoint, with first-stage leg servos omitted.
Figure 6:
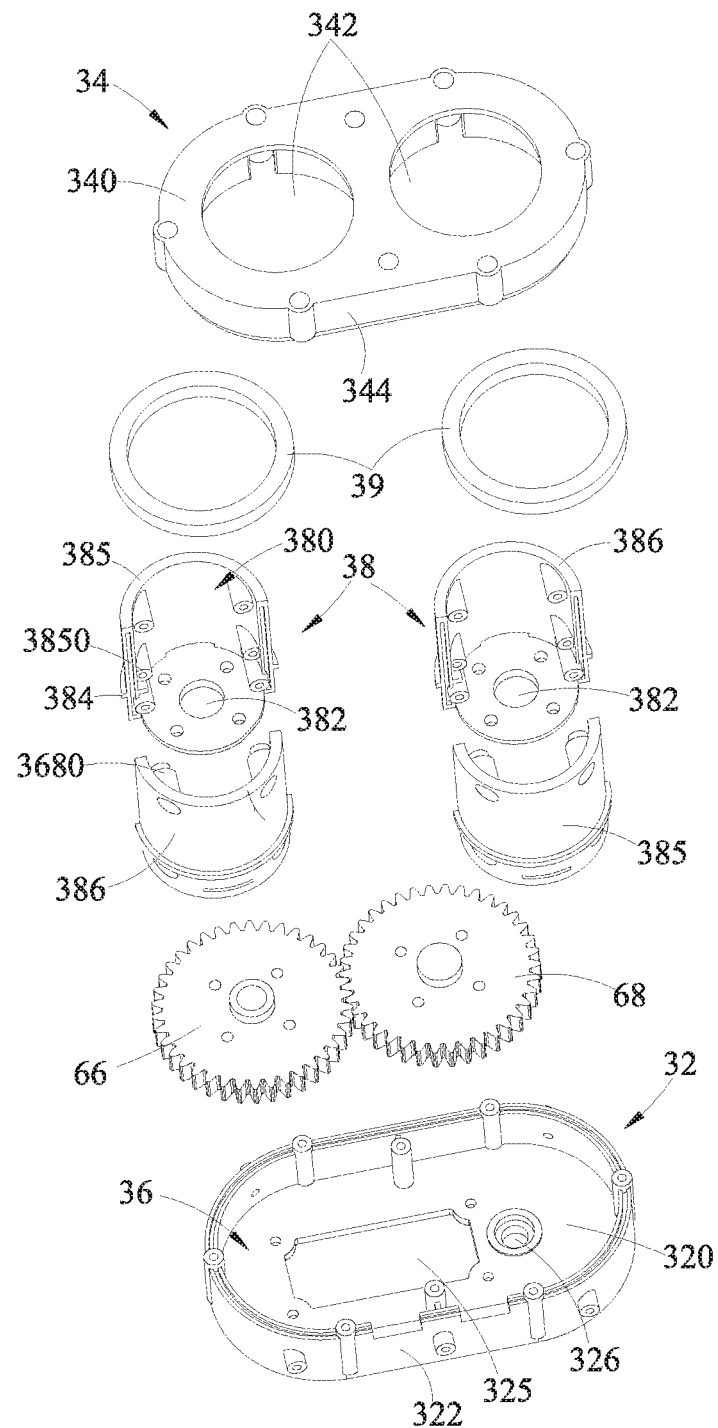
FIG. 6 is an exploded isometric view of the waist structure of FIG. 3 viewed from a second viewpoint, with first-stage leg servos omitted.

Referring to FIGS. 4-6, the support cover 32 includes a top plate 320 for mounting the waist servo 40 and a first side wall 322 extending along a periphery of the top plate 320. The support base 34 includes a bottom plate 340 facing the top plate 320 and a second side wall 344 extending along a periphery of the bottom plate 340 and securely connected to the first side wall 322. The bottom plate 340 defines the fixing holes 342 through which the first-stage leg servos 50 pass. The housing of the waist servo 40 is fixed to the top plate 320 and is located outside of the receiving chamber 36. The output shaft 42 of the waist servo 40 extends into the receiving chamber 36 and is engaged with the first transmission member. The first side wall 322 and the second side wall 344 are fixed to each other by fastening screws so that the support cover 32 and the support base 34 are securely connected to each other. In other embodiments, other fastening means may also be used such that the supported cover 32 is securely connected to the support base 34, such as a snap connection, without being limited thereto.

Referring to FIGS. 4-6, the support cover 32 defines a cavity 324 for securely mounting the waist servo 40, a first through hole 325 communicating the cavity 324 and the receiving chamber 36 so that the output shaft 42 is connected to the first transmission member 66, and a second through hole 326 for mounting the second transmission member 68. The cavity 324 is located in a side of the top plate 320 facing away from the receiving chamber 36. The housing of the waist servo 40 is fixed to the bottom of the cavity 324. The cavity 324 is provided to restrict the waist servo 40 from moving in different directions on the surface of the support cover 32 so as to ensure the stability of the connection of the housing of the waist servo 40 with the support cover 32. The output shaft extends into the accommodating chamber 36 through the first through hole 325 and is connected to the first transmission member 66. The second through hole 326 is used for mounting one end of the second transmission member 68.

In the embodiment, the first through hole 325, the cavity 324 and the receiving chamber 36 communicate with each other.

In the embodiment, the shape of the cavity 324 is similar to that of the housing of the waist servo 40 and is sized to avoid movement of the waist servo 40 within the cavity 324. The shape of the first through hole 325 is similar to the bottom periphery of the housing of the waist servo 40. The bottom periphery of the housing is received within the first through hole 325 to further limit movement or rotation of the housing of the waist servo 40 relative to the support cover 32, thereby ensuring the stability of the connection of the waist servo 40 and the support 32.

Referring to FIGS. 4-6, the support cover 32 includes ribs 328 that are arranged at the periphery of the cavity 324 and the second through hole 326 and spaced apart from each other. The ribs 328 are provided on the support cover 32 to enhance the overall strength of the support cover 32. In one embodiment, the ribs 328 around the cavity 324 are spaced from each other and extend in parallel along the longitudinal direction and the width direction of the cavity 324. The ribs 328 around the second through hole 326 are radially distributed, preferably at equal angular intervals.

Referring to FIGS. 4-6, the fixing frames 38 each define a fixing chamber 380 for mounting the first-stage leg servo 50 and a connecting hole 382 communicating with the fixing chamber 380. The connecting end 52 of each of the first-stage leg servos 50 is inserted into the connecting hole 382 and connected to the first transmission member 66 and the second transmission member 68. Each of the first-stage leg servo 50 is securely mounted in the fixing chamber 380 so that each first-stage leg servo 50 is securely connected to the fixing frame 38. The fixing frames 38 and the first-stage leg servos 50 can be rotated as driven by the waist servo 40. The connecting holes 382 are provided in the fixing frames 38 so that the connecting end 52 of each of the first-stage leg servos 50 is connected to the first transmission member 66 and the second transmission member 68.

It is to be understood that the first transmission member 66 and the second transmission member 68 each include a main body and a shaft protruding from opposite surfaces of the main body. The main bodies of the first transmission member 66 and the second transmission member 68 are engaged with each other. One shaft portion of the first transmission member 66 is connected to the output shaft 42 and the other shaft portion is connected to a connection end 52 of the first-stage leg servo 50. A shaft portion of the second transmission member 68 is fit into the second through hole 326 and the other shaft portion is connected to the connection end 52 of the other first-stage leg servo 50. When the first transmission member 66 and the second transmission member 68 are gears, the peripheral surfaces of the main bodies include mutually engaged teeth.

Referring to FIGS. 4-6, the support base 34 further includes a pair of extension walls 346 extending along the bottom plate 340 and arranged around a periphery of each of the fixing frames 38 and a support shoulder 348 between an inner wall of each fixing hole 342 and each extension wall 346. Each of the fixing frames 38 includes a projection 384 on an outer periphery thereof. The support assembly 30 further includes a ring 39 arranged between each support shoulder 348 and each projection 384. The support assembly 30 includes the extension walls 346 on the support base 34 to limit the movement of the fixing frames 38 relative to the support base 34. The support shoulder 348 and the projection 384 are provided such that the ring 39 is held between each support shoulder 348 and each projection 384 to prevent the fixing frames 38 from moving up and down along the support base 34. The rings 39 are arranged around the fixing frames 38 to enable the fixing frames 38 as a whole to rotate relative to the support base 34.

In the embodiment, the extension wall 346, the bottom plate 340 and the support shoulder 348 are integrally formed.

Referring to FIGS. 4-6, each of the fixing frames 38 includes a first mounting shell 385 and a second mounting shell 386 which face each other and securely connected to each other to form the fixing chamber 380. The first mounting shell 385 includes a first fixing portion 3850 on an inner wall of the fixing chamber 380. The second mounting shell 386 includes a second fixing portion 3860 on the inner wall of the fixing chamber 380 opposite to the first fixing portion 3850. The housing of the first-stage leg servo 50 includes fixing ribs 54 located between and securely connected to the first fixing portion 3850 and the second fixing portion 3860. It is to be understood that in order to facilitate the mounting of the first-stage leg servos 50 to the fixing frames 38, the fixing frame 38 is a two-piece structure. That is, the fixing frame 38 is formed by the first mounting shell 385 and the second mounting shell 386 that are fixed to each other. Screws pass through the first fixing portion 3850, the fixing ribs 54 and the second fixing portion 3860 so that the housing of the first-stage leg servo 50 is fixed to the first mounting shell 385 and the second mounting shell 386. The ring 39 is arranged around the first mounting shell 385 and the second mounting shell 386 to prevent them from radially separating from each other. Bottom portions of the first mounting shell 385 and/or the second mounting shell 386 of one fixing frame 38 are used for securely mounting the first transmission member 66. The bottom portions each define a connecting hole 382. Similarly, bottom portions of the first mounting shell 385 and/or the second mounting shell 386 of the other one fixing frame 38 are used for securely mounting the second transmission member 66, and each define a connecting hole 382.

It is to be understood that the fixing frames 38 are cylindrical such that they can rotate relative to the support base 34.

Referring to FIGS. 1-4, in the foregoing embodiments, the housing of the waist servo 40 is a cubic shape so as to be fixed to the support cover 32. The housing includes a power component (not labeled), a reduction mechanism driven by the power component to rotate, and the output shaft provided at the output end of the reduction mechanism. The reduction mechanism is realized by multi-stage gear transmission. It is to be understood that the internal power structure of the waist servo 40 is not limited thereto and may be of any configuration that can provide power.

Referring to FIGS. 1-6, a humanoid robot includes a head, a trunk connected with the head, and two legs and two arms connected to the trunk. The trunk includes a waist connected to the legs. The waist includes the waist structure 3 and the legs include the leg structures 2, which are described above and will not be repeated here.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A waist structure for connecting a trunk structure to leg structures of a humanoid robot, the waist structure comprising:
   a support assembly located between the trunk structure and the leg structures;
   a waist servo mounted on the support assembly and a pair of first-stage leg servos; and
   a transmission connected between the waist servo and the first-stage leg servos to enable the waist servo to drive the first-stage leg servos to rotate, the waist servo being configured to connect the trunk structure to the support assembly, and the first-stage leg servos being configured to connect the support assembly to the leg structures;
   wherein the waist servo comprises an output shaft connected to the transmission; each of the first-stage leg servos comprises a connecting end; the transmission comprises a first connecting member and a second connecting member securely mounted on the connecting ends, a first transmission member mounted on the output shaft and connected to the first connecting member, and a second transmission member driven by the first transmission member to rotate and connected to the second connecting member.

2. The waist structure of claim 1, wherein the first transmission member and the second transmission member are gears that are engaged with each other.

3. The waist structure of claim 1, wherein the support assembly comprises a support cover and a support base securely connected to each other and a pair of fixing frames for mounting the first transmission member and the second transmission member, the support cover and the support base cooperatively define a receiving chamber for accommodating the first transmission member and the second transmission member, the support base define fixing holes for allowing the two fixing frames to extend into the receiving chamber, and housings of the first-stage leg servos are fixed to the fixing frames and the connecting ends thereof are inserted into the receiving chambers and respectively connected with the first transmission member and the second transmission member.

4. The waist structure of claim 3, wherein the support cover comprises a top plate for mounting the waist servo and a first side wall extending along a periphery of the top plate: the support base comprises a bottom plate facing the top plate and a second side wall extending along a periphery of the bottom plate and securely connected to the first side wall, and the bottom plate defines the fixing holes through which the first-stage leg servos pass.

5. The waist structure of claim 4, wherein the support cover defines a cavity for securely mounting the waist servo, a first through hole communicating the cavity and the receiving chamber so that the output shaft is connected to the first transmission member, and a second through hole for mounting the second transmission member, and the cavity is located in a side of the top plate facing away from the receiving chamber.

6. The waist structure of claim 5, wherein the support cover comprises ribs at a periphery of the cavity and the second through hole, and the ribs are spaced apart from each other.

7. The waist structure of claim 4, wherein the support assembly further comprises the fixing frames each defining a fixing chamber for mounting the first-stage leg servo and a connecting hole communicating with the fixing chamber, the connecting end of each of the first-stage leg servos is inserted into the connecting hole and connected to the first transmission member and the second transmission member.

8. The waist structure of claim 7, wherein the support base further comprises a pair of extension walls extending along the bottom plate and arranged around a periphery of each of the fixing frames and a support shoulder between an inner wall of each fixing hole and each extension wall; each of the fixing frames comprises a projection on an outer periphery thereof, and the support assembly further comprises a ring arranged between each support shoulder and each projection.

9. The waist structure of claim 7, wherein each of the fixing frames comprises a first mounting shell and a second mounting shell which face each other and securely connected to each other to form the fixing chamber, the first mounting shell comprises a first fixing portion on an inner wall of the fixing chamber, the second mounting shell comprises a second fixing portion on the inner wall of the fixing chamber opposite to the first fixing portion, and a housing of the first-stage leg servo comprises a fixing rib located between and securely connected to the first fixing portion and the second fixing portion.

10. A humanoid robot comprising a head, a trunk connected with the head, and two legs and two arms connected to the trunk, the trunk comprising a waist connected to the leas, the waist comprising the waist structure of claim 1, and the legs comprising the leg structures of claim 1.

\* \* \* \* \*